Oct. 17, 1933.   J. P. RYAN   1,930,624
AUTOMATIC GAS AND OIL SHUT-OFF VALVE
Filed Dec. 30, 1931
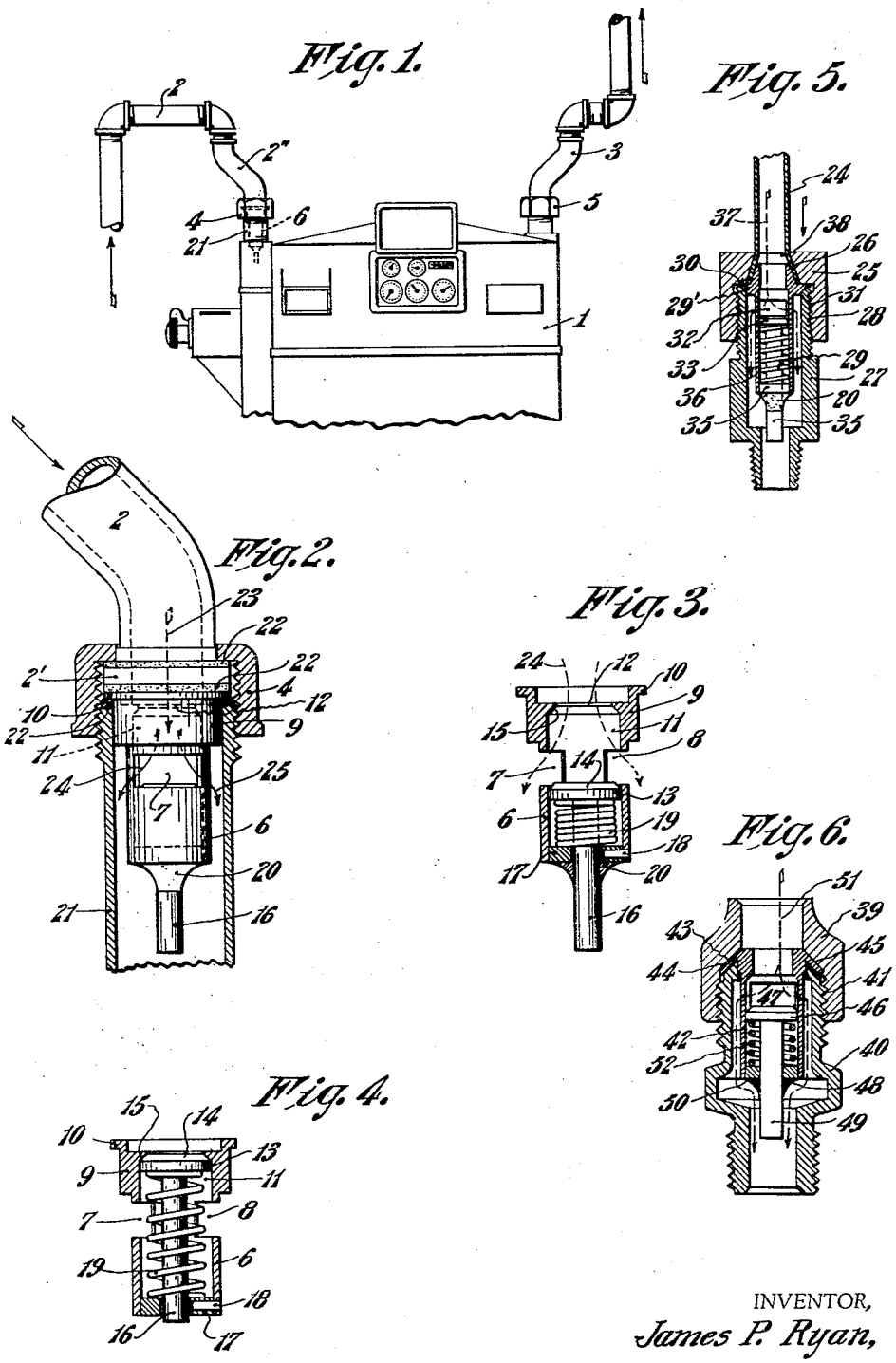
INVENTOR,
James P. Ryan,
BY
Harry W. Bown.
ATTORNEY.

Patented Oct. 17, 1933

1,930,624

UNITED STATES PATENT OFFICE 1,930,624

AUTOMATIC GAS AND OIL SHUT-OFF VALVE

James P. Ryan, Easthampton, Mass.

Application December 30, 1931
Serial No. 583,830

8 Claims. (Cl. 137—162)

This invention relates to improvements in automatic gas and oil shut-off valves.

An object of the invention is to provide a gas and oil shut-off valve device which may be readily inserted in the inlet gas main or pipe that is connected to a gas meter and one that will promptly and automatically close and shut off the flow of gas when the temperature near a gas meter reaches a definite or any predetermined degree of heat, as for example: 200° F. or 225° F., should a fire occur in the room or cellar where the meter is located.

Another object of the invention is that it may be easily and readily inserted in the gas inlet flow pipe near the meter and without disturbing or changing any of the usual pipe connections; it being only necessary to unscrew the pipe coupling and drop the automatic shut-off valve device in place in the inlet pipe and then re-connect the pipe coupling again.

A still further object of my invention is to provide a valve construction for positively shutting off the flow of oil to an oil burner of any particular type, as for example, an oil burner that is mounted or located in a kitchen range in place of the usual coal grates. The construction and arrangement being such that the valve will be closed at any desirable temperature. I do not confine myself to any specific temperature, but it is important that a comparatively low temperature will serve to release the normally closed valve by melting an alloy that normally retains the valve open and permits a spring, under compression, to move the valve to its seat. This automatic oil shutting off valve is installed in the oil pipe line at any suitable point, as desired.

Broadly, my invention comprises a casing or tubular member that is formed with gas or oil flow openings in its opposite sides, the diameter of this casing being less than the internal diameter of the supply pipe. The valve member proper is normally retained away from its seat, or in its open position, by means of fusible material which secures the stem of the valve to the casing, when cool or below its melting point, but when this fusible material melts, or becomes soft, the valve stem is released and a coiled spring, normally under tension, then automatically moves the valve proper to its seat, thus quickly closing or shutting off the flow of gas from the street, or oil supply mains, and preventing the possible escape of gas or oil into the room. The upper end of the valve casing is formed with a flange, whereby packing material may be placed on its upper and lower surfaces to form a gas-tight joint.

Referring to the drawing:

Fig. 1 is an elevational view showing a portion of a gas meter with the usual pipe connections and with the shut-off valve device inserted in the inlet pipe, as indicated in dotted lines.

Fig. 2 is an enlarged detail view of a portion of the inlet pipe illustrating my shut-off valve in place and the normal flow of gas, indicated by the arrows.

Fig. 3 is a detail sectional view illustrating the shut-off valve device removed from the inlet pipe with the valve proper open.

Fig. 4 is a sectional view showing the device with the valve proper closed, after the fusible material has been melted and releases the valve stem from the casing.

Fig. 5 is a modification showing a shut-off valve in an oil supply pipe, and

Fig. 6 is a further modification showing the gas shut-off valve open and a ground joint construction.

Referring to the drawing in detail:

1 indicates the usual gas meter having the gas inlet pipe 2 and the gas discharge pipe 3 connected thereto with couplings 4 and 5.

Referring to the detail construction of the automatic gas shut-off valve device, 6 indicates a cylindrical or tubular member, the opposite sides of which are formed with the gas outlet openings 7 and 8. The diameter of this tubular member is less than the internal diameter of the pipe connected to the meter. The head portion 9 is larger in diameter than the tubular portion 6 and is formed with a flange 10, the opening 11 in the head portion, and the gas passageway 12, whereby the full flow of gas is provided. Located within the tubular portion 6 is the valve member proper 13, the diameter of which is slightly less than the opening 11. It is formed with a bevelled portion 14 which engages the bevelled seat portion 15 of the head member 9. 16 indicates the valve stem which projects through the opening in the washer member 17 that is fixedly secured to the lower end of the tubular casing member 6 by means of the pin 18. Interposed between the valve 13 and the washer 17 is a coil spring 19 of the expansive type. This spring is normally under compression for retaining the valve 13 open and below the openings 7 and 8, as shown in Fig. 3, by means of the fusible alloy or material 20, that is soldered to the stem 16 and washer 17 by pouring the same around the stem and washer and allowing it to set.

The shut-off valve device is assembled as follows: The coupling 4 is unthreaded from the short pipe 21; the meter 1, as a whole, is then bodily turned a short distance about the coupling 5 as a pivot center, in order to free the pipe connections 2″ and 21 from each other. The valve device, as a whole, is then dropped into the pipe 21. It should be noted that the diameter of the head portion 9 substantially fills this pipe, as shown in Fig. 2. Packing devices 22, or material, are placed under the flange 10, and, above and below the flange 2' of the S-shaped piece of pipe 2″ to make a gas-tight joint. The meter is then swung back again into its original position and the coupling 4 again threaded onto the pipe 21. The gas shut-off valve device is now completely installed and ready for operation. The in-flow of the gas is indicated by the arrows 23, 24, and 25. The arrows 24 and 25 indicate the gas flowing through the openings 7 and 8 and through the pipe 21 into the meter. Should a fire occur and the fusible material 20 melt and release the stem 16, the valve 13 would be immediately forced to its seat 15 by means of the expansive spring 19 with the result that the gas is automatically and quickly shut off from flowing through the pipe 2 and opening 12 and escaping into the room, or other space. It will, therefore, be seen that I have provided an inexpensive shut-off valve that can be readily inserted in the gas supply pipe main that is connected to a meter, without disturbing any of the pipe connections or changing them in any way, also one that is automatic in that it is operative at a predetermined temperature.

Referring to Fig. 5, which shows a shut-off valve construction for an oil supply pipe line, 24, that is secured to the fitting 25 by expanding the end 26 into the flared opening. 27 is a casing member that is threaded at 28 to receive the threaded fitting 25. 29 is a valve casing that is secured to the fitting 25 by means of the conical surface of the flange 29' which is clamped between the annular shoulder 30 and the inclined end 31 of the valve casing 28. 32 is an oil opening in the casing 29. 33 is a valve that is normally held open with the fusible material 20 below the washer 35 in the lower end of the valve casing 29. The fusible material normally retains the spring 36 under compression and the valve 33 open. The flow of oil is indicated by the arrow 37. Should the fusible material 20 soften or melt from being heated from a fire, the valve stem 35 would be released and the spring 36 would move the valve 33 to its seat or closed position at the point 38.

Referring now to the construction, shown in Fig. 6, which is a modification of the gas shut-off valve, shown in Figs. 2, 3 and 4, 39 indicates a coupling member that is threaded into the casing 40, as shown at 41. The valve casing proper is shown at 42, which is retained in place with the integral annular inclined flange portion 43 which is clamped between the inclined surfaces 44 and 45 on the coupling 39 and the casing 40, as shown. The valve proper is indicated at 46 in open position below the gas outlet opening 47. This valve is, as before described, normally held open by means of the fusible material 48 on the stem 49 below the fixed washer 50. The normal flow of gas is indicated by the arrow 51. When the fusible material, 48, softens or melts, due to a fire in the room, the valve 46 is automatically closed by reason of the expansive force of the coiled spring 52. The construction, shown in Figs. 5 and 6, obviates the necessity of any packing material between the valve casing proper and the fitting.

What I claim is:—

1. An automatic gas closing valve device designed to be inserted in a gas supply main comprising a flanged casing member having an inlet opening and a valve seat surrounding the opening, the casing having an opening below the inlet opening, a valve in the casing, a stem attached to the valve, a washer closing an end of the casing through which the stem of the valve projects, fusible material on the stem and washer for holding the valve open, and a spring between the valve and washer for closing the valve when the fusible material melts.

2. As an article of manufacture, an automatic shut-off valve comprising a one piece apertured casing having a flanged head portion with an opening in the head portion, a valve for closing the opening, fusible means for holding the valve open, and means for automatically moving the valve to close the opening at a predetermined temperature.

3. As an article of manufacture, an automatic shut-off valve comprising a one-piece apertured casing having a flanged head portion with an opening in the head portion, a valve for closing the opening, a stem connected to the valve, fusible material on the stem normally holding the valve open, and a normally compressed coil spring between the valve and a closed end of the casing for automatically moving the valve to close the opening at a predetermined temperature.

4. As an article of manufacture, an automatic shut-off valve comprising a one-piece ported casing having a conical-shaped flanged head portion with an opening in the head portion, a valve for closing the opening, a stem connected to the valve, fusible material on the stem normally holding the valve open and a normally compressed coil spring between the valve and a closed end of the casing for automatically moving the valve to close the opening at a predetermined temperature.

5. An automatic shut-off valve for supply pipes for oil burners comprising a fitting or coupling member having a conical-shaped opening and an annular shoulder, a pipe expanded into the opening, a valve receiving casing having a threaded connection with the coupling and engaging the annular shoulder, a valve casing proper having an opening and a conical surface engaging the expanded end of the pipe and a second conical surface engaging a like surface on the valve-receiving casing, a valve in the valve casing, fusible means for holding the valve normally open and means for closing the valve at the temperature for fusing said holding means.

6. An automatic shut-off valve construction comprising in combination a threaded casing member formed with an inclined end portion, a valve-receiving casing having an opening and a conical flange engaging the said inclined end portion, a coupling having an inclined surface engaging the conical flange of the valve-receiving casing, a valve in the valve casing, means tending to close the valve, and means for normally maintaining the valve open but permitting it to automatically close at a predetermined temperature.

7. As an article of manufacture, a valve casing having a flanged end and an opening adjacent the flange, a valve in the casing, a valve stem, fusible means on the stem for holding the valve open and a spring normally under compression between the valve and the other end of the casing.

8. An oil shut-off valve comprising in combination an outer casing having an inclined surface, a valve casing in the outer casing having an inclined surface engaging the inclined surface of the outer casing, the valve casing having a second inclined surface with which a supply pipe engages, a coupling connecting the outer casing, the pipe and valve casing together, a spring-controlled valve in the inner casing and fusible means for holding the valve open.

JAMES P. RYAN.